US012730621B2

(12) United States Patent
Yang

(10) Patent No.: US 12,730,621 B2
(45) Date of Patent: Sep. 8, 2026

(54) NETWORK INTERFACE DEVICE REDUCING STARTUP TIME OF APPLICATIONS

(71) Applicant: Intel Corporation, Santa Clara, CA (US)

(72) Inventor: Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/955,797

(22) Filed: Sep. 29, 2022

(65) Prior Publication Data

US 2023/0023766 A1 Jan. 26, 2023

(30) Foreign Application Priority Data

Aug. 29, 2022 (WO) ................ PCT/CN2022/115525

(51) Int. Cl.
*G06F 8/61* (2018.01)
*G06F 9/445* (2018.01)

(52) U.S. Cl.
CPC ............ *G06F 8/63* (2013.01); *G06F 9/44505* (2013.01)

(58) Field of Classification Search
CPC ......... G06F 9/455; G06F 9/44505; G06F 8/63
See application file for complete search history.

(56) References Cited

U.S. PATENT DOCUMENTS 7,343,560 B1 * 3/2008 Tanner ...................... G06F 8/63 715/744
10,901,700 B2 * 1/2021 Wang ........................ G06F 8/35
11,573,814 B1 * 2/2023 Aithal ................... G06F 16/188
11,803,303 B1 * 10/2023 Huo ...................... G06F 3/0607
2005/0138638 A1 6/2005 Pilkington et al.
2016/0044095 A1 2/2016 Sankar et al.
2017/0026461 A1 1/2017 Boutros et al.
2018/0225237 A1 * 8/2018 Edirisooriya ........... G06F 13/28
2019/0222518 A1 7/2019 Bernat et al.
2020/0389410 A1 12/2020 Guim Bernat et al.
2021/0255846 A1 * 8/2021 Mamgain ................ H04L 67/34
2021/0328886 A1 10/2021 Guim Bernat et al.
2022/0225226 A1 7/2022 Yang et al.
2023/0319133 A1 * 10/2023 Kutch .................. H04L 67/101 709/223
2023/0325080 A1 * 10/2023 Huo .................... G06F 11/1441

(Continued)

FOREIGN PATENT DOCUMENTS

WO 2017062014 4/2017

OTHER PUBLICATIONS

Chen, Bin, "Open Container Initiative (OCI) Specifications", https://www.alibabacloud.com/blog/open-container-Initiative-oci-specifications_594397, Alibaba Cloud, Jan. 18, 2019, 8 pages.

(Continued)

*Primary Examiner* — Marina Lee
(74) *Attorney, Agent, or Firm* — Compass IP Law PC

(57) ABSTRACT

Examples described herein relate to a network interface device that includes circuitry and a memory. In some examples, the circuitry is to perform image construction operations, wherein the image construction operations comprise access to a base image of an application from the memory in the network interface device. In some examples, the circuitry is to provide a host server access to a constructed image bundle of the application.

18 Claims, 9 Drawing Sheets

(56) References Cited

U.S. PATENT DOCUMENTS

| | | | | |
|---|---|---|---|---|
| 2024/0012666 | A1 | 1/2024 | Gao et al. | |
| 2024/0356887 | A1 | 10/2024 | Maskara et al. | |
| 2025/0036401 | A1 * | 1/2025 | Ross | G06F 8/71 |

OTHER PUBLICATIONS

Crippa, Francisco Sedano, "Understanding Container Images, Part 1: Image Layers", https://blogs.cisco.com/developer/container-image-layers-1, Cisco Blogs, Jan. 25, 2021, 16 pages.
Crippa, Francisco Sedano, "Understanding Container Images, Part 3: Working with Overlays", https://blogs.cisco.com/developer/373-containerimages-03, Cisco Blogs, Feb. 16, 2021, 10 pages.
Desarda, Akash, "A complete guide to building a Docker Image serving a Machine learning system in Production", https://towardsdatascience.com/a-complete-guide-to-building-a-docker-image-serving-a-machine-learning-system-in-production-d8b5b0533bde, Published in Towards Data Science, Feb. 2021, 13 pages.
Odd Bit Blog, "Unpacking Docker images with Undocker", https://blog.oddbit.com/post/2015-02-13-unpacking-docker-Images/, Feb. 2015, Last updated Feb. 2023, 5 pages.
OpenFaas, CLI "Build Functions", https://docs.openfaas.com/cli/build/, An independent open-source project created in 2016, 10 pages.
OpenFaas, Stack, "Layers and responsibilities", https://docs.openfaas.com/architecture/stack/#layers-and-responsibilities, An independent open-source project created in 2016, 3 pages.
Vivid Code, "Understanding OCI Image Spec", https://vividcode.io/understanding-oci-image-spec/, Dec. 28, 2021, 10 pages.
First Office Action for U.S. Appl. No. 18/205,984, Mailed Sep. 23, 2025, 15 pages.
Chang, Emily, "Monitoring services and setting SLAs with Datadog", https://www.datadoghq.com/blog/set-and-monitor-slas/, Last updated Apr. 8, 2019, 15 pages.
Confidential Containers, "Welcome to Confidential Containers", https://github.com/confidential-containers, Downloaded from internet Jun. 9, 2023, 4 pages.
Kubernetes, "Pull an Image from a Private Registry", https://kubernetes.io/docs/tasks/configure-pod-container/pull-image-private-registry/, Last updated Jan. 13, 2023, 5 pages.
U.S. Appl. No. 17/955,797, Figures 1 and 2 Known Prior Art, Apr. 2022.
Final Office Action for U.S. Appl. No. 18/205,984, Mailed Feb. 10, 2026, 19 pages.

* cited by examiner

NETWORK INTERFACE DEVICE REDUCING STARTUP TIME OF APPLICATIONS

RELATED APPLICATION

This application claims priority to PCT/CN2022/115525, filed Aug. 29, 2022. The entire contents of that application is incorporated by reference in its entirety.

DESCRIPTION

Function as a service (FaaS) is a category of cloud computing services that allows development, execution, and management of application functionalities independent from building and maintaining infrastructure associated with developing and launching an application. FIG. 1 depicts various approaches to implement FaaS (Fn) as a Virtual Machine (VM), container, and process. In scenario (a), an Fn is implemented in a VM. In scenario (b), an Fn is implemented in a container. In scenario (c), an Fn is implemented in a process in a container. In scenarios (a) to (c), the code can be compiled and the executable program packaged with libraries in a file system.

As a FaaS application can execute for a relatively short-lived duration, a start-up duration of the FaaS application can impact the time-to-completion of the FaaS application and whether a service level agreement (SLA) of the FaaS application is met. Constructing an execution environment for the FaaS application, can be divided into running execution environments (VM, container, process) and packaging image or file systems information (including code, libraries).

FIG. 2 depicts an example system in which a host accesses a container image registry. For example, host 200 can download base images or templates used by a FaaS application in VM 202 from container image registry 204. In constructing the image or file system part of VM 202, execution code and libraries can be packaged for the FaaS application in host system 200, which executes the FaaS application. To accelerate the start of FaaS application, if the FaaS application is scheduled to run in a VM, the VM can standby and be reused instead of shutting down the VM after running first FaaS application. A common image shared among different instances of an FaaS application can be cached in memory of host 200. Potential issues with caching the image in the host can include information leaking and utilization of central processing unit (CPU) resources to manage the cached images required by the FaaS applications.

DETAILED DESCRIPTION

As described herein, at least to lessen CPU utilization and host resource uses for constructing and executing FaaS, some examples construct the FaaS images at a network interface device instead of, or in addition, to the host. The network interface device can perform image construction including file system information of FaaS applications. FaaS startup can be accelerated by a network interface device performing container image acquisition (e.g., executable code, libraries) and file system bundle preparation for FaaS applications. Network interface device accelerators can be used for image decompression, decryption, etc. Network interface device can cache the images and enable sharing of the unpacked image layers for other executions of FaaS applications.

The host can save CPU, memory, or storage resources that would otherwise be used to startup FaaS applications. Downloading time of images for FaaS applications can be reduced by storing a cache of images in the network interface device. In some cases where network interface device and the host can share memory space (e.g., through Compute Express Link (CXL) or other approaches) via an emulated device with additional base address register (BAR) space in Peripheral Component Interconnect express (PCIe), then page cache information of the constructed file system can be shared by the network interface device with the host.

When the images area constructed by network interface device, network interface device can share the images with the host through virtual function (VF) or physical function (PF) devices and the host can directly hotplug (including hot attach) the devices to virtual machines (VMs), containers, or other execution environments, and mount the devices to a specific mount. After the execution of the FaaS application, the network interface device can hot remove (including hot detach) the devices from the host. Leak of sensitive information in an unauthorized manner, such as data related with the function of some users, or the function image of some users, can be less likely to occur.

Figure 1:
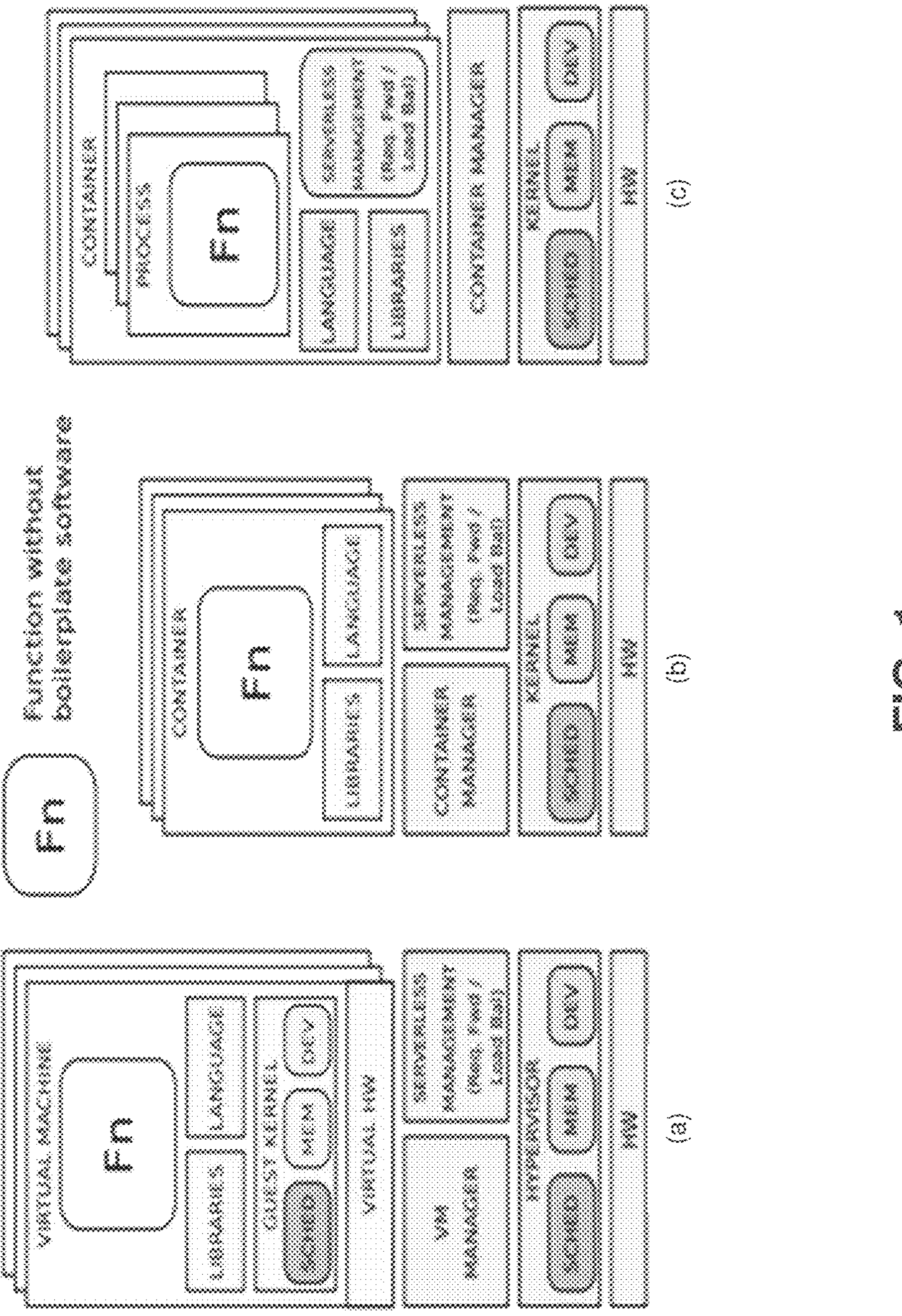
FIG. 1 depicts examples of environments.
Figure 2:
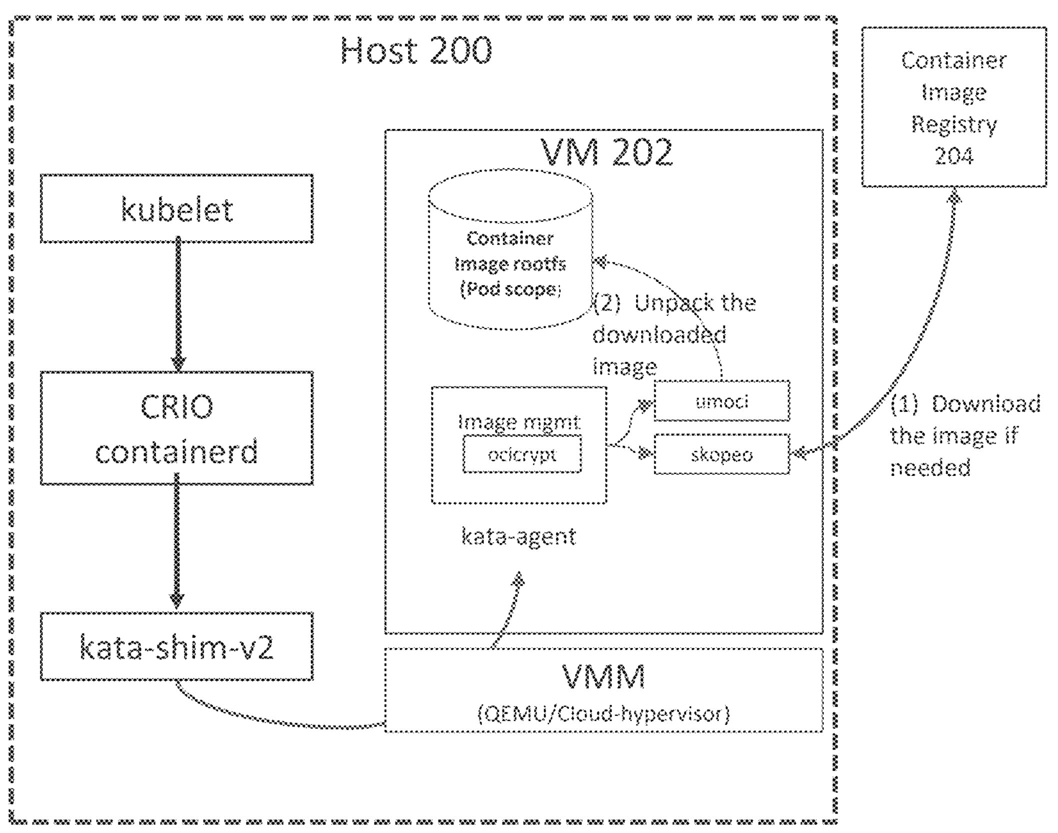
FIG. 2 depicts an example system in which a host accesses a container image registry.
Figure 3:
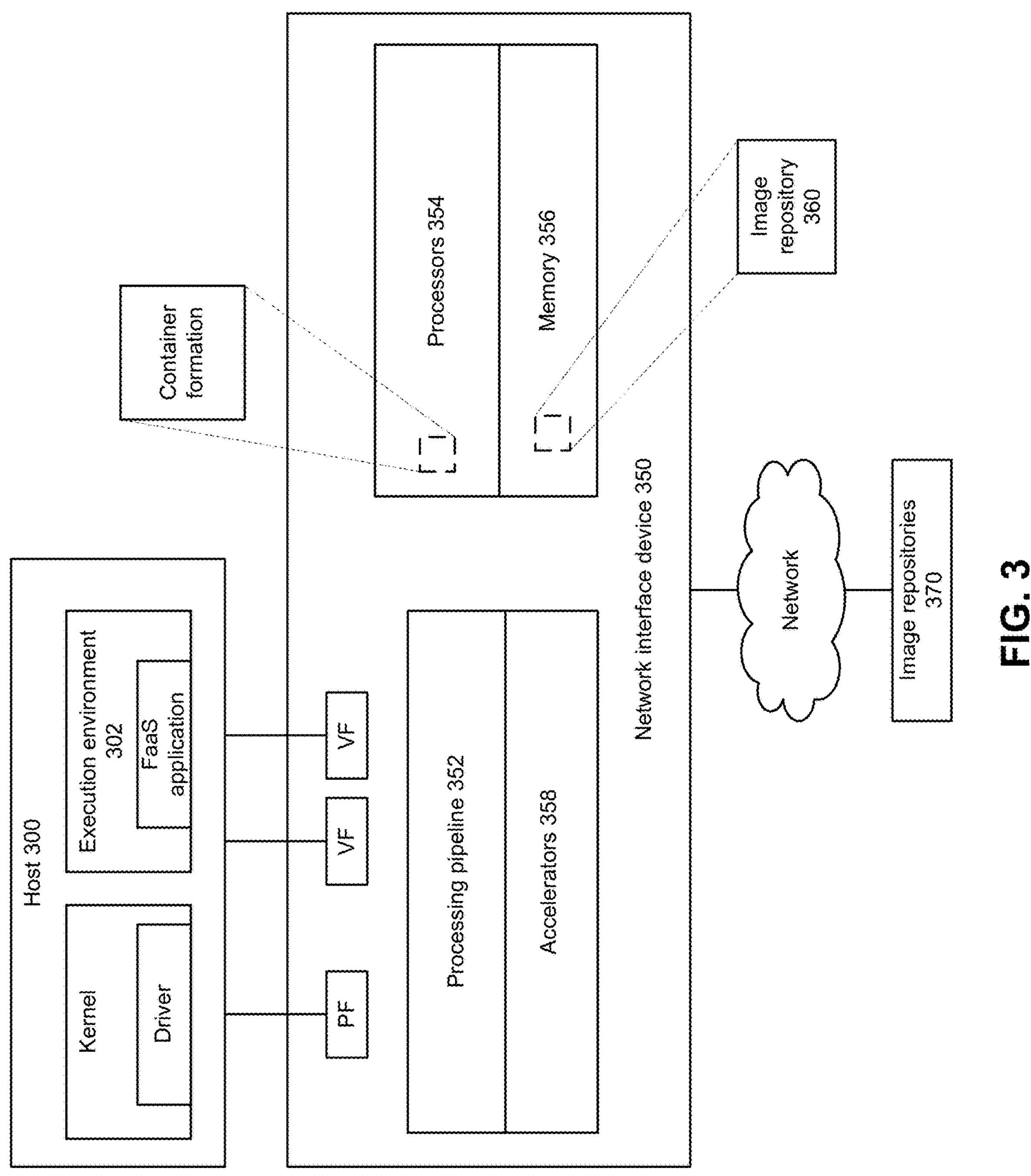
FIG. 3 depicts an example system.

FIG. 3 depicts an example system. Host 300 can include one or more processors, one or more memory devices, one or more device interfaces, as well as other circuitry and software described at least with respect to one or more of FIGS. 8 and 9. Processors (not shown) of host 300 can execute software such as applications or FaaS applications (e.g., microservices, virtual machine (VMs), microVMs, containers, processes, threads, or other virtualized execution environments), operating system (OS), and one or more device drivers. For example, an application executing on host 300 can utilize network interface device 350 to receive or transmit packets. An OS or device driver can configure network interface device 350 to perform FaaS container image construction operations.

Network interface device 350 can include at least packet processing pipeline circuitry 352, processors 354, memory 356, and accelerators 358 as well as other circuitry and software. Various examples of network interface device 350 are described in one or more of FIGS. 7-9. Processing pipeline circuitry 352 can be implemented using one or more of: application specific integrated circuit (ASIC), field programmable gate array (FPGA), processors executing software, or other circuitry. Various examples of packet processing pipeline circuitry 352 are described herein such as but not limited to programmable pipeline 904 of FIG. 9.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

To perform image construction at least of an FaaS application, network interface device 350 can perform one or more of: (1) access a base image or template of the FaaS application from image repositories 370 or a cache of a base image or template of FaaS application from memory 356; (2) construct images of FaaS applications by merging the base image with a dynamic image portion (e.g., execution binary with libraries for related FaaS function(s)); (3) utilize software storage acceleration software path (e.g., Non-volatile Memory express (NVMe) over fabrics (NVMe-oF) or virtio target) for transport (e.g., NVMe Protocol Initiator) to export the image as a physical function (PF) or virtual function (VF) device to host 300 (e.g., PF and VF are associated with Single Root I/O Virtualization (SR-IOV) and/or Peripheral Component Interconnect Express (PCIe)); and/or (4) host 300 to directly access the PF or pass through the VF to the VMs, containers, or other environments executing the FaaS application. Host 300 can mount the device and start the FaaS application.

At a request of host 300, processing pipeline 352, or processors 354, one or more accelerators 358 can perform lookaside crypto Engine (LCE) (e.g., compression or decompression), Address Translation Engine (ATE) (e.g., input output memory management unit (IOMMU) to provide virtual-to-physical address translation), local area network (LAN) packet transmissions or receipts, compression/decompression, encryption/decryption, or other operations. For example, to compress image or templates prior to storage in image repository 360, compression operations of accelerators 358 can be utilized. For example, after access of image or templates from image repository 360, decompression operations of accelerators 358 can be performed.

Another example of image construction for an FaaS application or other process can be as follows. Network interface device 350 can export virtio_blk PF/VF to host 300. Network interface device 350 can create virtual host controller (vhost ctrlrs). Network interface device 350 can download the image (e.g., skopeo and umoci), and copy the unpacked container image file into a formatted block device (e.g., lvol_bdev). Network interface device 350 can create a snapshot based on the previous block device and then make clones from it. Network interface device 350 can use the cloned bdevs to server as backend storages for vhost ctrlrs. Host 300 can utilize block devices initialized from virtio-blk PF/VF as container images. Host 300 can mount the bdevs created from virtio-blk PF/VF, and can find container image bundles (i.e., container root filesystem) under the mounted directories. Network interface device 350 can construct a root file system (rootfs) of a container. Network interface device 350 can configure and start the Storage Performance Development Kit (SPDK)-based block target, open management interface of block related device, and construct block related vhost device. Network interface device 350 can create lvol bdev and copy unpacked container image, create lvol bdev and export it through network block devices (NBD), format the nbd block device and mount it to a folder in order to copy downloaded/cached container image bundles, and create snapshot from the lvol bdev and then create clone from snapshot. Network interface device 350 can map lvol bdev as backend storage for a blk device exported by the block target, such as mapping the clone bdev to specific port of blk device.

When the container runtime software is notified that the rootfs of the container is prepared, host 300 can use Modprobe virtio_blk or NVMe driver in the kernel to initialize block device, create VF from virtio_blk or NVMe PF and initialize block device from the VF if need to use in VM, and mount the obtained block device and use the container image in mounted directories.

Examples of scripts to create a block related device (e.g., rpc.py script) and create lvol bdev and export it through NBD are as follows:

```
dd if=/dev/zero of=image_test.file bs= 1M count = 512
./scripts/rpc.py scripts/rpc.py bdev_aio_create image_test.file
aio0 4096
./scripts/rpc.py scripts/rpc.py bdev_lvol_create_lvstore aio0
lvol0
./scripts/rpc.py scripts/rpc.py bdev_lvol_create -l lvol0
bdev_lvol0 768
./scripts/rpc.py scripts/rpc.py nbd_start_disk lvol0/bdev_lvol0
/dev/nbd0
```

Examples of scripts to format the NBD block device and copy unpacked container image are as follows:

```
mkfs -t ext4 /dev/nbd0
mkdir /mnt/test_for_nbd
mount /dev/nbd0 /mnt/test_for_nbd/
cp -r busybox_bundle /mnt/test_for_nbd/
./scripts/rpc.py nbd_stop_disk /dev/nbd0
```

Examples of scripts to create a snapshot and clone from lvol bdev are as follows:

```
./scripts/rpc.py bdev_lvol_snapshot lvol0/bdev_lvol0
snap_bdev_lvol0
./scripts/rpc.py bdev_lvol_clone lvol0/snap_bdev_lvol0 clon0
./scripts/rpc.py bdev_lvol_clone lvol0/snap_bdev_lvol0 clon1
./scripts/rpc.py bdev_lvol_clone lvol0/snap_bdev_lvol0 clon2
//The 3 bdevs can be used by 3 different containers.
Map cloned bdevs to different port of blk related devices
```

Figure 4:
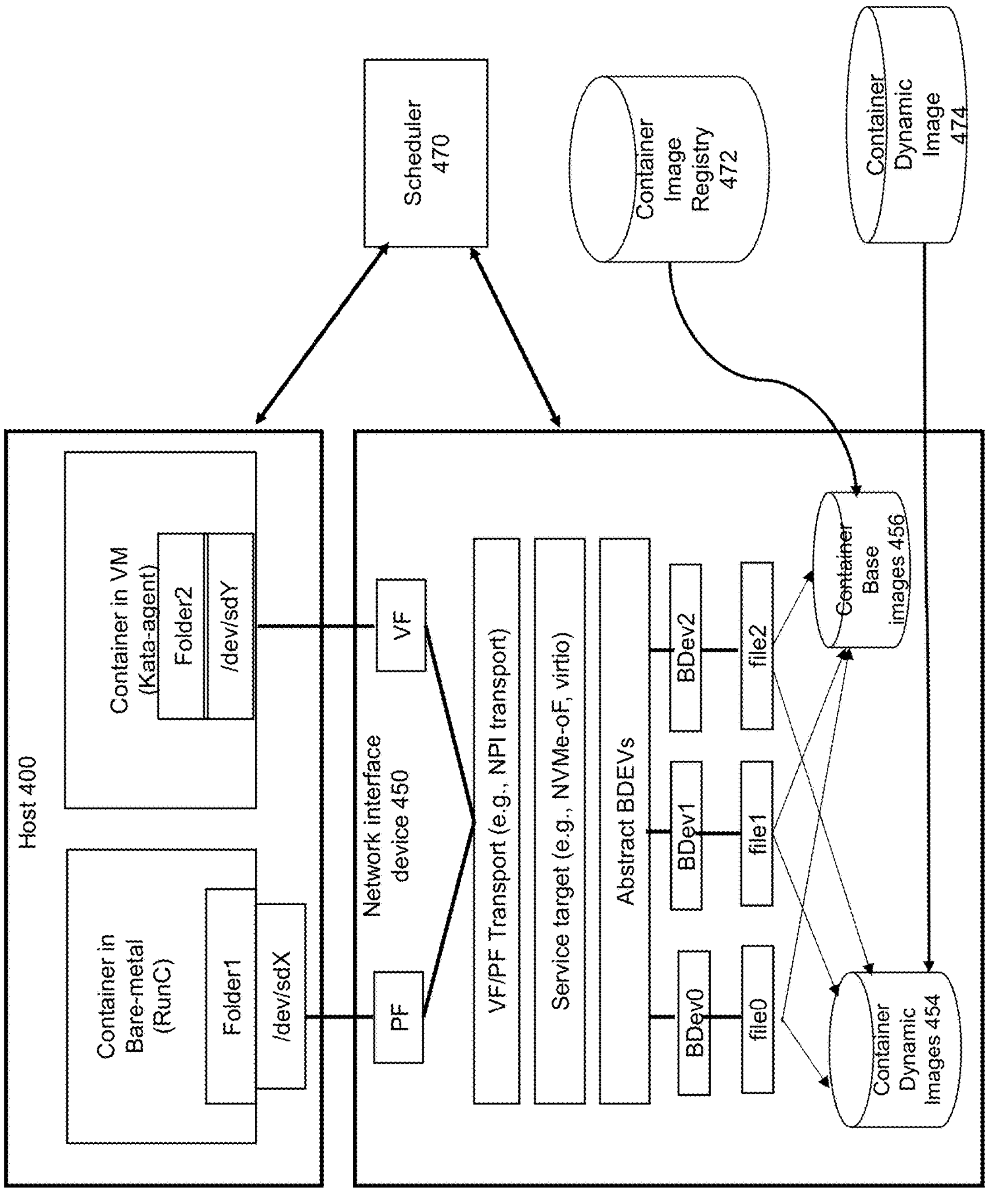
FIG. 4 shows an architecture to accelerate the image construction via network interface device for accelerating start-up of FaaS applications.

FIG. 4 shows an architecture to accelerate image construction and accelerating start-up of FaaS applications by use of a network interface device. Host 400 can include one or more processors to execute FaaS applications in VMs, containers, or processes. Various examples of host 400 are described at least with respect to FIGS. 8 and/or 9. Network interface device 450 can provide image and filesystems of a FaaS application for execution by host 400. Various examples of network interface device 450 are described at least with respect to FIGS. 7, 8, and/or 9.

The following operations can be performed to construct an execution environment for a FaaS application. By performing one or more of (1) to (8), host 400 can save utilization of CPU, memory, storage resources as host 400 does not need to construct at least a file system again for one or more FaaS. At (1), scheduler 470 can communicate with network interface device 450 in response to receipt of a FaaS execution request from network interface device 450 to request providing an image bundle (e.g., rootfs) of a container or other execution environment. Scheduler 470 can be implemented as one or more of: Kubernetes (K8S), containerd, runc, Kata Containers, or others. Network interface device 450 can receive a task request that may include a code segment from a task dispatcher of scheduler 470. The task request can identify the code segment in one or more programming languages or specify which container images are to be downloaded.

At (2), network interface device 450 can retrieve a base image (e.g., root file system (root fs)) from base container image registry 472 and store the base image into container base images 456 if the base image is not stored in container base images 456 in memory accessible to network interface device 450. A base image can include a common OS environment with execution environment for one or more languages (e.g., Java, C++. Python and etc.). If multiple FaaS application use the same base image, the base image can be stored and retrieved from container base images 456 to lessen amount of time spent retrieving the base image for a common image. Base container image registry 472 can be allocated in a memory or storage device accessible to network interface device 450 through communications of one or more packets. Container base images 456 can be allocated in a memory in network interface device 450, host 400, or accessible to network interface device 450.

At (3), network interface device 450 can prepare a root file system for an FaaS application. For example, Storage Performance Development Kit (SPDK) block device layer (bdev) is a C library that provides an operating system block storage layer that interfaces with device drivers in a kernel storage stack. In network interface device 450, an SPDK based block service target (e.g., NVMe-oF, vhost) can be utilized with SPDK's lvol's snapshot feature (e.g., https://spdk.io/doc/logical_volumes.html).

At (4), network interface device 450 can unpack the image from registry 472 or container base images 456 into a block device (bdev) (e.g., https://spdk.io/doc/bdev.html) exported by a service target (e.g., service daemon block) running on network interface device 450 (e.g., NVMe or iSCSI target) (e.g., https://spdk.io/doc/nvmf.html, https://spdk.io/doc/vhost.html, and https://spdk.io/doc/iscsi.html), and a root file system (rootfs) can be accessed and operated in host 400. Host 400 can execute rootfs within a container or other virtual execution environment for FaaS application. An example of rootfs is described in https://opensource.com/article/18/8/sysadmins-guide-containers. Aside from rootfs, more layers can be prepared with bdev snapshot or cloned features.

At (5), network interface device 450 can compress base images for storage in container base images 456 and subsequent access. A base image can be consistent with Open Container Initiative (e.g., https://github.com/opencontainers/image-spec/blob/main/spec.md) and can access a file system.

At (6), network interface device 450 can cross-compile the received code segment with the required language (e.g., C++) with some pre-stored libraries and generate a customized image of container dynamic images 454. Dynamic images 454 can include one or more executable binaries with related libraries for executing one or more FaaS. For example, if the FaaS is to be executed in C, a dynamic image can include compiled executable binary for the C code with the related dynamic loaded libraries if these libraries are not part of the base image. In some examples, cross-compilation of the received code segment with designated language can be performed by a processor of host 400. Dynamic image compilation can be performed host 400 and/or network interface device 450. Compiled received code can be stored in container dynamic image 474. Container dynamic image 454 can be allocated in a memory or storage device accessible to network interface device 450 through communications of one or more packets. Dynamic container image 474 can be allocated in a memory in network interface device 450, host 400, or accessible to network interface device 450.

After the rootfs is prepared by network device 450, host 400 can start the container, or other execution environment. For example, host 400 can utilize containerd with designated running class to start the container, or other execution environment. For example, Kata Containers execution flow can be used to launch containers (e.g., https://github.com/kata-containers/documentation/blob/master/how-to/contained-kata.md).

At (7), network interface device 450 can combine a base image and dynamic image into a file (e.g., Linux® loop device). Container dynamic image 474 can be accessed to retrieve dynamic images into container dynamic images 454. FaaS container images can use an overlay FS format so that network interface device 450 provisions the features to construct FaaS container file systems. Contents in file0, file1 and file2 can include backup files of a loop device (e.g., loop0, loop1, loop2) to store the unpacked image file system of the containers. So, when executing the FaaS application through the corresponding files on the emulated device provided by network interface device 450, network interface device 450 can perform unpacking operations instead of, or in addition to host 400 performing unpacking operations.

At (8), network interface device 450 can use a virtual block device target service (e.g., NVMe-oF, virtio) with designated transports (e.g., NPI for NVMe) to expose a virtual function (VF) or physical function (PF) to host 400. A file can be encapsulated as a block device and those block devices can be used separately or inform virtual bdev in the block service target, such as with an SPDK NVMe-oF target solution framework.

At (9), the block service target export VF/PFs to host 400. Files file0, file1, and file2 can be converted to block devices for host 400. At (10), host 400 can directly use the PF for running the FaaS application in the BareMetal, or pass-through a VF to the VM. At (11), when the VM or host kernel accesses the VF/PF, a block device is accessed after loading the related device drivers. Host 400 can mount the block device to a specific file system. In some examples, a block device after loading device drivers in the host OS (e.g., /dev/sdc or /dev/nvme2n1) can be used by RunC and can be mounted into Folder1 whereas another block device after loading device drivers in the host OS (e.g., /dev/sdc or /dev/nvme2n1) can be used by a VM and mounted into Folder2 in the VM. Host 400 can execute FaaS applications based on file system information exported by network interface device 450.

Figure 5:
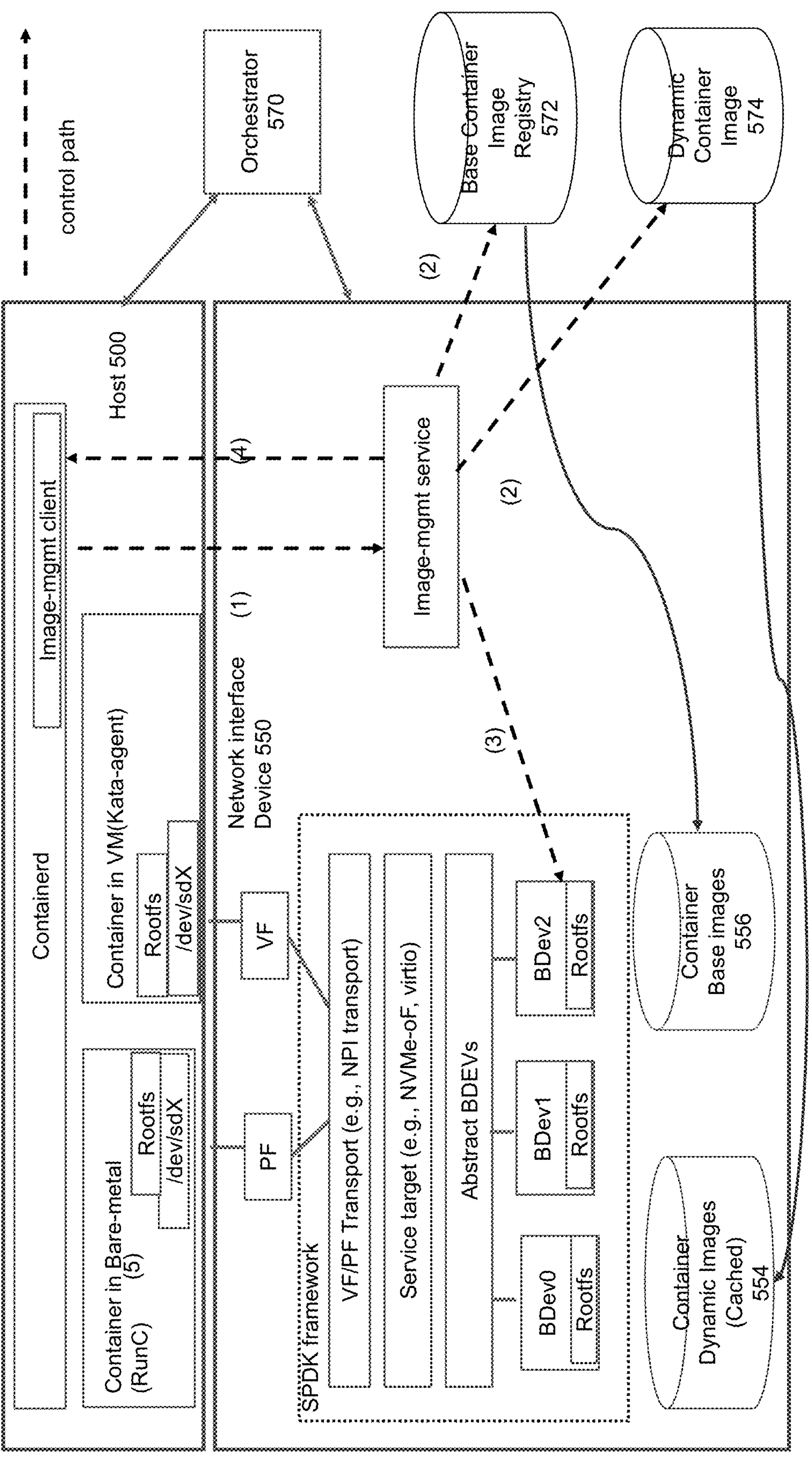
FIG. 5 depicts an example to construct images.

FIG. 5 depicts an example to construct images. An example operation to construct an execution environment for FaaS usage scenario can be as follows. Host 500 can include one or more processors to execute FaaS applications in VMs, containers, or processes. Various examples of host 500 are described at least with respect to FIGS. 8 and/or 9. Network interface device 550 can provide image and file-systems of a FaaS application for execution by host 500. Various examples of network interface device 550 are described at least with respect to FIGS. 7, 8, and/or 9.

At (1), orchestrator 570 can communicate with network interface device 550 after receiving a FaaS running request from end users. Network interface device 550 can receive specifications of an image bundle (e.g., identification of a rootfs) of a container from image management client (image-mgmt client) executing on a processor of host 500. At (2), an image management service (image-mgmt service) executing on a processor of network interface device 550 can download the dynamic image and base image for a FaaS application from respective dynamic image registry 574 and base container image registry 572. However, if the dynamic image is available in container dynamic image 554 accessible to network interface device 550, image management service can copy the dynamic image from container dynamic image 554. If the base image is available in container base image 556 accessible to network interface device 550, image management service can copy the base image from container base image 556.

Base container image registry 572 can be allocated in a memory or storage device accessible to network interface device 550 through communications of one or more packets. Container base images 556 can be allocated in a memory in network interface device 550, host 500, or accessible to network interface device 550. Container dynamic image 554 can be allocated in a memory or storage device accessible to network interface device 550 through communications of one or more packets. Dynamic container image 574 can be allocated in a memory in network interface device 550, host 500, or accessible to network interface device 550.

At (3), image-mgmt service unpacks the images into an assigned block device (e.g., Bdev0, Bdev1, or Bdev2). At (4), network interface device 550 can use a virtual block device target service (e.g., NVMe-oF, virtio) with designated transports (e.g., NVMe protocol initiator (NPI) for NVMe) to export this bdev via a VF or PF to host 500 for access by associated block device drivers in its kernel. Network interface device 550 can notify container software via remote procedure call (RPC) or other technology. The information can include a container identity as well as VF and PF information including the filesystem type. At (5), based on the VM or host kernel identifying the VF and PF, a block device can be accessed after loading the related device drivers. Container management software can mount the block device (e.g., /dev/sdc or /dev/nvme2n1) to a specific mounting point. Host 500 can start containers with the rootfs contained in the block device by mounting the device with the designated file system into a file folder (e.g., /mnt/container0). Then the rootfs can be directly reviewed in the mounted file folder (e.g., /mnt/container0).

A block device approach presents image information required by the FaaS application and OS of host 500. After the FaaS stops execution, the block device provided by the network interface device 550 can be destroyed from host 500. Operations to destroy the resources of a FaaS application can be as follows. At (1), the VF/PF device can be hot removed from host 500. At (2), the related bdev constructed by the file, e.g., file0, can be removed. At (3), the file0 in network interface device 550 can be destroyed by the management software with deletion operations (e.g., with rm command in a shell) and the dynamic image in the dynamic image registry 554 if needed.

The following operations can be performed to destroy the resources when the network interface device 550 receives a request from container management executed by host 500. At (1), container management (e.g., Containerd) can communicate with the image-mgmt service executed by network interface device 550 that the container is shutdown. At (2), Image-mgmt service executed by network interface device 550 can communicate with a block service target to locate the bdev used by the container. At (3), a block service target in network interface device 550 can hot remove the VF/PF device related to the bdev to host 500, and an event (e.g., PCIe device hotplug event) can be sent to host indicating the related VF/PF is hot plugged.

Figure 6:
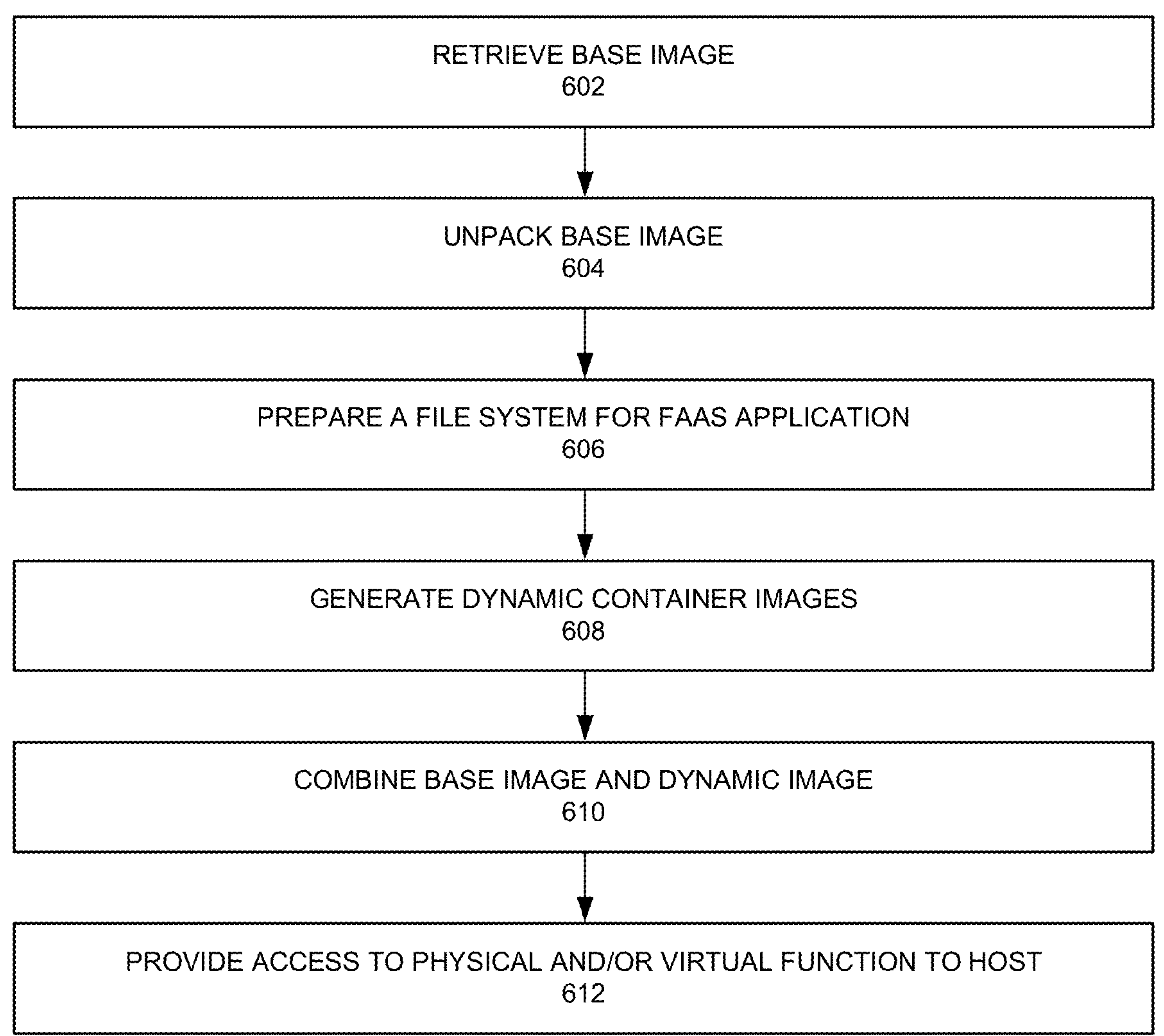
FIG. 6 depicts an example process.

FIG. 6 depicts an example process. The process can be performed by a network interface device to perform FaaS image construction operations offloaded from a host. As described herein, network interface device can download images as well as store some images in a memory for subsequent use. At 602, in response to a request from the FaaS and container management software executed by a host to construct an image bundle for a FaaS and container, network interface device can retrieve a base image from a base container image registry in memory accessible to network interface device or from a network accessible base image repository. Network interface device can store the base image into base container image registry in a memory in or accessible to network interface device (e.g., memory in network interface device and/or memory in host) if the base image is not cached in its base container image registry.

At 604, network interface device can unpack the base image by extract one or more layers of an image onto the local filesystem. At 606, network interface device can prepare a root file system for an FaaS application into a block device managed by a virtual storage target based on SPDK framework and provision the block device to the host through a VF/PF. The host can discover the VF/PF and identify the VF/PF to a block device (e.g., /dev/sdc) and mount the device with the file system type information given by network interface device. Host can execute rootfs within a container or other virtual execution environment for a FaaS application.

At 608, the network interface device can cross-compile a code segment received from an orchestrator or image manager executing on a host with libraries from and generate an image of container dynamic images. Dynamic images can include one or more executable binaries with related libraries for executing one or more FaaS. At 610, network interface device can combine a dynamic image and base image into a file. File contents can include unpacked image file system of the containers. Network interface device can perform unpacking work can be avoided in the host side.

Network interface device may not directly provide file system service interface to the host and instead provide a simulated block device to the host via VF/PF. At 612, network interface device can use a virtual block device target service with designated transports to expose a virtual function (VF) or physical function (PF) to host 400. The file can be encapsulated as a block device and those block devices can be used separately or inform virtual bdev in the block service target in the network interface device, such as with an SPDK NVMe-oF target solution framework. The network interface device can export VF/PFs to host.

Thereafter, the host can access a block device after loading the related device drivers by accessing accesses the VF/PF. The host can mount the block device to a specific file system. A block device provided by the IPU with no filesystem information cannot be consumed by the FaaS/container. For FaaS and container execution, the host accesses an image bundle (i.e., a rootfs which contains the execution binary, libraries and OS environment). The host can start the container, or other execution environment.

Figure 7:
FIG. 7 depicts an example network interface.
Figure 7:
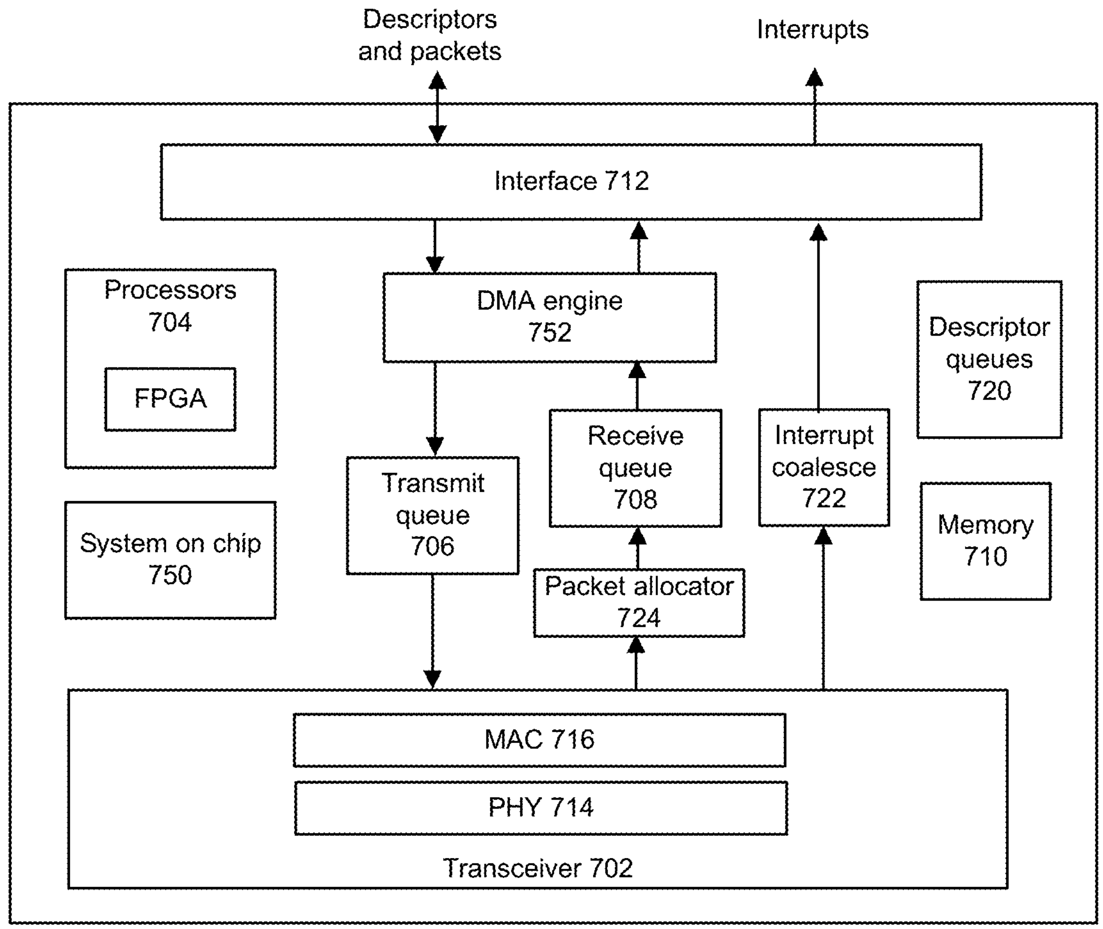

FIG. 7 depicts an example network interface or packet processing device. In some examples, FaaS image construction operations can be offloaded to network interface device, as described herein. In some examples, packet processing device 700 can be implemented as a network interface controller, network interface card, a host fabric interface (HFI), or host bus adapter (HBA), and such examples can be interchangeable. Packet processing device 700 can be coupled to one or more servers using a bus, PCIe, CXL, or DDR. Packet processing device 700 may be embodied as part of a system-on-a-chip (SoC) that includes one or more processors, or included on a multichip package that also contains one or more processors.

Some examples of packet processing device 700 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to assemble data to be transmitted into packets, that include destination and source addresses along with network control information and error detection hash values.

Processors 704 can be any a combination of a: processor, core, graphics processing unit (GPU), field programmable gate array (FPGA), application specific integrated circuit (ASIC), or other programmable hardware device that allow programming of network interface 700. For example, a "smart network interface" can provide packet processing capabilities in the network interface using processors 704.

Processors 704 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL) or packet drops due to queue overflow.

Configuration of operation of processors 704, including its data plane, can be programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), Data Plane Development Kit (DPDK), OpenDataPlane, among others. Processors 704 and/or system on chip 750 can execute instructions to configure and utilize one or more circuitry as well as check against violation against use configurations, as described herein.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can include volatile and/or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Figure 8:
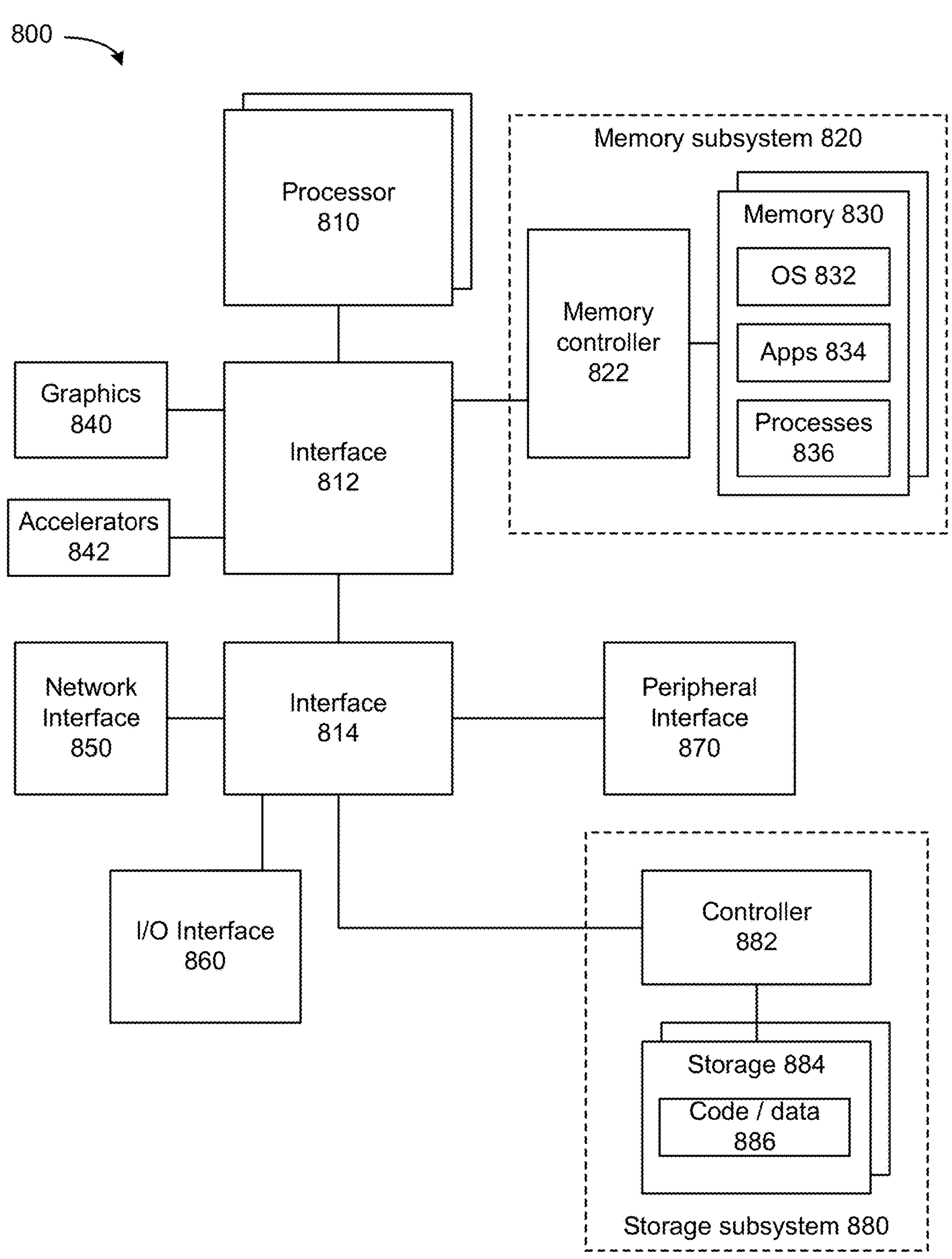
FIG. 8 depicts an example computing system.

FIG. 8 depicts a system. In some examples, operation of programmable pipelines of network interface 850 can configured to perform FaaS image construction operations can be offloaded to network interface device, as described herein. System 800 includes processor 810, which provides processing, operation management, and execution of instructions for system 800. Processor 810 can include any type of microprocessor, central processing unit (CPU), graphics processing unit (GPU), XPU, processing core, or other processing hardware to provide processing for system 800, or a combination of processors. An XPU can include one or more of: a CPU, a graphics processing unit (GPU), general purpose GPU (GPGPU), and/or other processing units (e.g., accelerators or programmable or fixed function FPGAs). Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a display that provides an output to a user. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a programmable or fixed function offload engine that can be accessed or used by a processor 810. For example, an accelerator among accelerators 842 can provide data compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models to perform learning and/or inference operations.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

Applications 834 and/or processes 836 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host. In some examples, an operating system can issue a configuration to a data plane of network interface 850.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a processor sold or designed by Intel®, ARM®, AMD®, Qualcomm®, IBM®, Nvidia®, Broadcom®, Texas Instruments®, among others. In some examples, OS 832 or driver can enable or disable network interface 1050 to adjust operation of programmable pipelines of network interface 850 to perform FaaS image construction operations can be offloaded to network interface device.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. In some examples, network interface 850 or network interface device 850 can refer to one or more of: a network interface controller (NIC), a remote direct memory access (RDMA)-enabled NIC, SmartNIC, router, switch (e.g., top of rack (ToR) or end of row (EoR)), forwarding element, infrastructure processing unit (IPU), or data processing unit (DPU). An example IPU or DPU is described at least with respect to FIG. 7. Network interface device 850 can be implemented as a system on chip (SoC) system with its own network resources (e.g., IP address) and processor, memory, and storage resources.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A non-volatile memory (NVM) device is a memory whose state is determinate even if power is interrupted to the device.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., a non-volatile memory express (NVMe) device can operate in a manner consistent with the Non-Volatile Memory Express (NVMe) Specification, revision 1.3c, published on May 24, 2018 ("NVMe specification") or derivatives or variations thereof).

Communications between devices can take place using a network that provides die-to-die communications; chip-to-chip communications; circuit board-to-circuit board communications; and/or package-to-package communications. A die-to-die communications can utilize Embedded Multi-Die Interconnect Bridge (EMIB) or an interposer.

In an example, system 800 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 9:
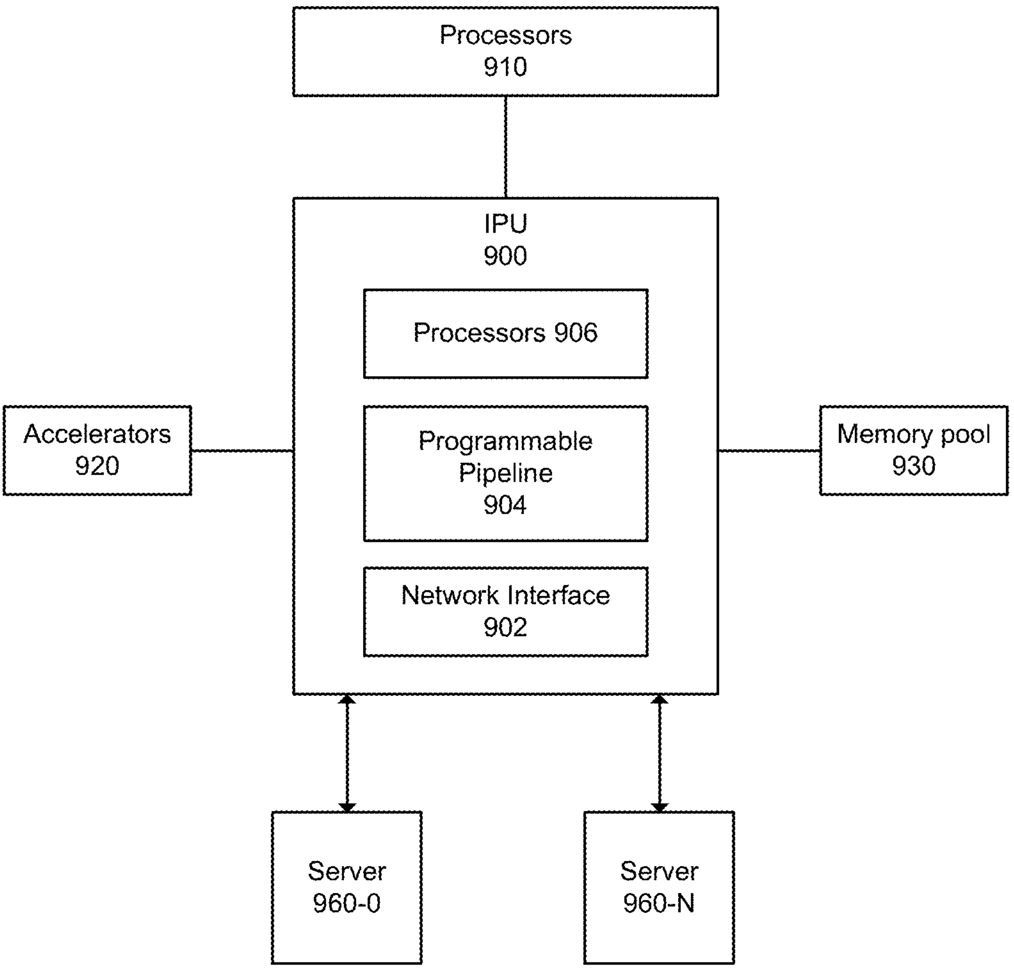
FIG. 9 depicts an example computing system.

FIG. 9 depicts an example system. In this system, IPU 900 manages performance of one or more processes using one or more of processors 906, processors 910, accelerators 920, memory pool 930, or servers 940-0 to 940-N, where N is an integer of 1 or more. In some examples, processors 906 of IPU 900 can execute one or more processes, applications, VMs, containers, microservices, and so forth that request performance of workloads by one or more of: processors 910, accelerators 920, memory pool 930, and/or servers 940-0 to 940-N. IPU 900 can utilize network interface 902 or one or more device interfaces to communicate with processors 910, accelerators 920, memory pool 930, and/or servers 940-0 to 940-N. IPU 900 can utilize programmable pipeline 904 to process packets that are to be transmitted from network interface 902 or packets received from network interface 902. Programmable pipeline 904 and/or processors 906 can be configured to perform detection of power usage per-VM or per-container by execution of a telemetry agent or analytics system or both, as described herein.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."'

Illustrative examples of the devices, systems, and methods disclosed herein are provided below. An embodiment of the devices, systems, and methods may include one or more, and combination of, the examples described below.

Example 1 includes one or more examples and includes a computer-readable medium comprising instructions stored thereon, that if executed by one or more processors, cause the one or more processors to: perform image construction operations in a network interface device by access to a base image of an application from a memory in the network interface device and provide a host access to a constructed image bundle of the application.

Example 2 includes one or more examples, wherein the perform image construction operations comprises merging the base image with a dynamic image portion.

Example 3 includes one or more examples, wherein the perform image construction operations include file system preparation and dynamic image retrieval.

Example 4 includes one or more examples, wherein the dynamic image comprises one or more of: an execution binary and one or more libraries.

Example 5 includes one or more examples, wherein to provide a host access to a constructed image bundle of the application, the network interface device is to present a file system to the host as a physical function (PF) or virtual function (VF) device.

Example 6 includes one or more examples, wherein the file system is accessible as a block device to the host via a PF or VF.

Example 7 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), XPU, or network-attached appliance.

Example 8 includes one or more examples, and includes an apparatus that includes an interface and a network interface device coupled to the interface and coupled to a host server, wherein the network interface device comprises circuitry and a memory, the circuitry is to perform image construction operations, wherein the image construction operations comprise access to a base image of an application from the memory in the network interface device and provide a host server access to a constructed image bundle of the application.

Example 9 includes one or more examples, wherein the perform image construction operations comprises merge the base image with a dynamic image portion.

Example 10 includes one or more examples, wherein the perform image construction operations include file system preparation and dynamic image retrieval.

Example 11 includes one or more examples, wherein the dynamic image comprises one or more of: an execution binary and one or more libraries.

Example 12 includes one or more examples, wherein to provide a host access to a constructed image bundle of the application, the circuitry is to present a file system to the host as a physical function (PF) or virtual function (VF) device.

Example 13 includes one or more examples, wherein the file system is accessible as a block device to the host via a PF or VF.

Example 14 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Example 15 includes one or more examples, and includes the host server, wherein the host server is to access a block device comprising a file system by access to a virtual function (VF) or physical function (PF), mount the block device to a specific file system, and start an execution environment of the application.

Example 16 includes one or more examples, and includes a data center, wherein the data center comprises the host server and a second server, wherein the second server is to provide to the network interface device one or more of: base image and a dynamic image portion.

Example 17 includes one or more examples, and includes a method comprising: in a network interface device, performing image construction operations comprising accessing to a base image of an application from the memory in the network interface device and in the network interface device, providing a host server access to a constructed image bundle of the application.

Example 18 includes one or more examples, wherein the perform image construction operations include file system preparation and dynamic image retrieval.

Example 19 includes one or more examples, wherein the dynamic image comprises one or more of: an execution binary and one or more libraries.

Example 20 includes one or more examples, wherein the providing a host access to a constructed image bundle of the application, the circuitry is to present a file system to the host as a physical function (PF) or virtual function (VF) device.

The invention claimed is:

1. At least one non-transitory computer-readable medium comprising instructions stored thereon, that if executed by one or more processors, cause the one or more processors to:
- based on detected capability to perform image construction in a network interface device, wherein the network interface device comprises a host interface, direct memory access (DMA) circuitry, a network interface, and circuitry, enable the circuitry of the network interface device to:
  - perform image construction operations by access to a base image of an application and merge the base image and a dynamic image portion to create a constructed image bundle and
  - provide a host system with access to the constructed image bundle.

2. The computer-readable medium of claim 1, wherein the perform image construction operations includes file system preparation and dynamic image portion retrieval.

3. The computer-readable medium of claim 1, wherein the dynamic image portion comprises one or more of: an execution binary and one or more libraries.

4. The computer-readable medium of claim 1, wherein to provide the host system with access to the constructed image bundle, the network interface device is to present constructed image bundle to the host system as a physical function (PF) or virtual function (VF) device.

5. The computer-readable medium of claim 4, wherein the constructed image bundle is accessible as a block device to the host system via a PF or VF.

6. The computer-readable medium of claim 1, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), X processing unit (XPU), or network-attached appliance.

7. An apparatus comprising:
- an interface and
- a network interface device coupled to the interface and coupled to a host server, wherein;
  - the network interface device comprises a host interface, direct memory access (DMA) circuitry, network interface, and circuitry,
  - the circuitry is to perform image construction operations to create a constructed image bundle, wherein the image construction operations comprise access a base image of an application and merge the base image with a dynamic image portion and
  - provide the host server with access to the constructed image bundle.

8. The apparatus of claim 7, wherein the perform image construction operations include file system preparation and dynamic image retrieval.

9. The apparatus of claim 7, wherein the dynamic image portion comprises one or more of: an execution binary and one or more libraries.

10. The apparatus of claim 7, wherein the circuitry is to provide the host server with access to the constructed image bundle by presentation of a file system to the host server as a physical function (PF) or virtual function (VF) device.

11. The apparatus of claim 10, wherein the file system is accessible as a block device to the host server via a PF or VF.

12. The apparatus of claim 7, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

13. The apparatus of claim 7, comprising the host server, wherein the host server is to access a block device comprising a file system by access to a virtual function (VF) or physical function (PF), mount the block device to a specific file system, and start an execution environment of the application.

14. The apparatus of claim 13, comprising a data center, wherein the data center comprises the host server and a second server, wherein the second server is to provide to the network interface device with one or more of: base image and the dynamic image portion.

15. A method comprising:
- in a network interface device comprising a host interface, direct memory access (DMA) circuitry, and network interface, performing image construction operations to create a constructed image bundle, wherein the performing the image construction comprises accessing a base image of an application and merging the base image with a dynamic image portion and
- in the network interface device, providing a host server with access to the constructed image bundle.

16. The method of claim 15, wherein the performing image construction operations includes preparing a file system.

17. The method of claim 15, wherein the dynamic image portion comprises one or more of: an execution binary and one or more libraries.

18. The method of claim 15, wherein the
- providing the host server with access to the constructed image bundle comprises presenting a file system to the host server as a physical function (PF) or virtual function (VF) device.

* * * * *